United States Patent
Kumar et al.

(10) Patent No.: US 10,103,897 B2
(45) Date of Patent: Oct. 16, 2018

(54) METHOD AND APPARATUS FOR MANAGING SUBSCRIPTION TO A POLICY COUNTER

(71) Applicant: TELEFONAKTIEBOLAGET LM ERICSSON (PUBL), Stockholm (SE)

(72) Inventors: R. Kumar, Chennai (IN); Rameshwaran Thulasidoss, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/558,480

(22) PCT Filed: Mar. 18, 2015

(86) PCT No.: PCT/IN2015/050024
§ 371 (c)(1),
(2) Date: Sep. 14, 2017

(87) PCT Pub. No.: WO2016/147198
PCT Pub. Date: Sep. 22, 2016

(65) Prior Publication Data
US 2018/0069714 A1  Mar. 8, 2018

(51) Int. Cl.
H04W 4/24 (2018.01)
H04L 12/14 (2006.01)
H04M 15/00 (2006.01)

(52) U.S. Cl.
CPC ...... *H04L 12/1407* (2013.01); *H04L 12/1417* (2013.01); *H04L 12/1467* (2013.01);
(Continued)

(58) Field of Classification Search
CPC ............. H04L 12/1407; H04L 12/1417; H04L 12/1489; H04L 47/11
See application file for complete search history.

(56) References Cited

U.S. PATENT DOCUMENTS 9,807,644 B2 * 10/2017 Ma .................... H04W 28/0289
2013/0176908 A1 * 7/2013 Baniel ................ H04L 12/1407
370/259

(Continued)

OTHER PUBLICATIONS

The Extended European Search Report issued in Application No. 15885310.1-1216 dated Feb. 20, 2018, 6 pages.
(Continued)

*Primary Examiner* — Dung Hong
(74) *Attorney, Agent, or Firm* — Rothwell, Figg, Ernst & Manbeck, p.c.

(57) ABSTRACT

A method, performed in a Policy and Charging Rules Function (PCRF) for managing subscription to a policy counter maintained at an Online Charging System (OCS) is disclosed. The PCRF is operable to communicate with the OCS over an Sy reference point. The method comprises receiving an All Users subscription trigger from a network operator (202), the All Users subscription trigger identifying a network policy, and sending a Spending Limit Request (SLR) command to the OCS (208), the SLR command specifying an identifier of a policy counter for the network policy and specifying application of the SLR command to all ongoing Sy sessions between the PCRF and the OCS. Also disclosed is a method, performed in an OCS, for managing subscription by a PCRF to a policy counter maintained at the OCS. The method comprises receiving an SLR command from the PCRF (302), the SLR command specifying an identifier of a policy counter and specifying application of the SLR command to all ongoing Sy sessions between the PCRF and the OCS, and applying the received SLR command with respect to the specified policy counter identifier to each ongoing Sy session between the OCS and the PCRF (306-314). Also disclosed are a PCRF, an OCS and a computer program product.

16 Claims, 8 Drawing Sheets

(52) U.S. Cl.
CPC ........... *H04M 15/64* (2013.01); *H04M 15/66* (2013.01); *H04M 15/8228* (2013.01); *H04W 4/24* (2013.01)

(56) References Cited

U.S. PATENT DOCUMENTS

| | | | |
|---|---|---|---|
| 2014/0064151 A1* | 3/2014 | Shaik | H04M 15/64 370/259 |
| 2014/0066004 A1* | 3/2014 | Shaik | H04L 12/1407 455/406 |
| 2014/0086052 A1* | 3/2014 | Cai | H04L 47/748 370/235 |
| 2014/0233368 A1 | 8/2014 | Baniel et al. | |
| 2014/0335815 A1 | 11/2014 | Ephraim et al. | |
| 2016/0112896 A1* | 4/2016 | Karampatsis | H04W 28/0252 370/230.1 |

OTHER PUBLICATIONS

3GPP, 3rd Generation Partnership Project; Technical Specification Group Core Network and Terminals; Policy and Charging Control signalling flows and Quality of Service (QoS) parameter mapping (Release 13), 3GPP TS 29.213, V13.1.0, Mar. 2015, 213 pages.
International Search Report and Written Opinion issued in Application No. PCT/IN2015/050024 dated Jan. 18, 2016, 7 pages.
ETSI TS 129 219 V12.2.0; Digital cellular telecommunications system (Phase 2+); Universal Mobile Telecommunications System (UMTS); LTE; Policy and charging control: Spending limit reporting over Sy reference point (3GPP TS 29.219 version 12.2.0 Release 12), Oct. 2014, 24 pages.

* cited by examiner

METHOD AND APPARATUS FOR MANAGING SUBSCRIPTION TO A POLICY COUNTER

CROSS REFERENCE TO RELATED APPLICATION(S)

This application is a 35 U.S.C. § 371 National Stage of International Patent Application No. PCT/IN2015/050024, filed Mar. 18, 2015, designating the United States, the disclosure of which is incorporated by reference.

TECHNICAL FIELD

The present invention relates to a method and apparatus for managing subscription to a policy counter maintained at an Online Charging System. The present invention also relates to a computer program product configured, when run on a computer, to carry out a method for managing subscription to a policy counter.

BACKGROUND

Within a 3GPP communication network, a Policy and Charging Rules Function (PCRF) supports the creation of rules and makes policy decisions for subscribers to the network. One of the functions of the PCRF is to make policy decisions for subscribers based on individual subscriber spending limits. An Online Charging System (OCS) maintains real-time policy counters for subscribers, and the status of these counters is used by the PCRF as input to policy decisions.

The Sy reference point is located between the PCRF and the OCS, and enables transfer of policy counter status information relating to subscriber spending from the OCS to the PCRF. The Sy reference point is illustrated in FIG. 1, which demonstrates relationships between different functional entities in a reference network architecture 100. The Sy reference point is specified in 3GPP Technical Specification 29.219 and supports the following functions:

Request from the PCRF to the OCS for policy counter status reporting.

Subscription/un-subscription by the PCRF to/from notifications from the OCS of policy counter status changes.

Notification of spending limit reports from the OCS to the PCRF.

Cancellation of spending limit reporting from the PCRF to the OCS.

When the status of policy counters is first required by the PCRF to make a policy decision for a network user, the PCRF uses an Initial Spending Limit Report Request procedure. The PCRF may request one or more specific policy counter statuses for the network user, or may request all policy counter statuses be reported by the OCS for the user. The OCS then provides the status to the PCRF of the requested policy counters, and will notify the PCRF of any changes in the status of those policy counters.

The PCRF may request reporting for a specific policy counter or counters to which it is not currently subscribed, and/or may cancel reporting for specific policy counter statuses using an Intermediate Spending Limit Report Request. The PCRF may cancel spending limit reporting for all policy counters for a user via a Final Spending Limit Report Request.

An Sy session between the PCRF and OCS is initiated when an Initial Spending Limit Report Request is issued by the PCRF for a user. The Sy session is terminated when a Final Spending Limit Report Request is issued by the PCRF for the user. Each spending limit report request is specific to a particular Sy session. Occasionally, circumstances may require a PCRF to add or remove subscription to one or more policy counters for multiple ongoing Sy sessions at the same time. This may be the case for example in the event of a special promotion at the network level, or of a discontinuation of a particular service. In such circumstances, the issuance of multiple Intermediate Spending Limit Report Requests, one for each ongoing Sy session, leads to a signalling burst between the PCRF and the OCS which may be detrimental to overall network performance.

SUMMARY

It is an aim of the present invention to provide a method and apparatus which obviate or reduce at least one or more of the disadvantages mentioned above.

According to an aspect of the present invention, there is provided a method, performed in a Policy and Charging Rules Function (PCRF) for managing subscription to a policy counter maintained at an Online Charging System (OCS) wherein the PCRF is operable to communicate with the OCS over an Sy reference point. The method comprises receiving an All Users subscription trigger from a network operator, the All Users subscription trigger identifying a network policy, and sending a Spending Limit Request (SLR) command to the OCS, the SLR command specifying an identifier of a policy counter for the network policy and specifying application of the SLR command to all ongoing Sy sessions between the PCRF and the OCS.

According to different examples of the invention, the PCRF and OCS may be in the same or different Home Public Land Mobile Networks (HPLMNs).

According to examples of the invention, the All Users subscription trigger may identify a plurality of network policies. In such examples, the SLR command may specify an identifier of a policy counter for each of the specified network policies.

According to examples of the invention, the method may further comprise receiving a Spending Limit Answer (SLA) from the OCS, the SLA confirming application of the SLR command to all ongoing Sy sessions between the PCRF and the OCS.

According to examples of the invention, the method may further comprise updating an internal record for each ongoing Sy session between the PCRF and the OCS with application of the SLR command.

According to examples of the invention, updating an internal record for each ongoing Sy session between the PCRF and the OCS with application of the SLR command may comprise, for each ongoing Sy session between the PCRF and the OCS, performing one of adding or removing the specified policy counter identifier to or from a list of policy counter identifiers for which the PCRF will receive status update notifications from the OCS for that Sy session.

According to examples of the invention, specifying application of the SLR command to all ongoing Sy sessions between the PCRF and the OCS may comprise setting a Spending Limit Request Type Attribute Value Pair (AVP) of the SLR command to one of SUBSCRIBE_ALL or REMOVE_ALL.

According to examples of the invention, the All Users subscription trigger may specify one of provision or removal of the identified network policy; if the All Users subscription trigger specifies provision of the identified network policy, specifying application of the SLR command to all ongoing Sy sessions between the PCRF and the OCS may comprise setting a Spending Limit Request Type AVP of the SLR command to SUBSCRIBE_ALL; and if the All Users subscription trigger specifies removal of the identified network policy, specifying application of the SLR command to all ongoing Sy sessions between the PCRF and the OCS may comprise setting a Spending Limit Request Type AVP of the SLR command to REMOVE_ALL.

According to another aspect of the present invention, there is provided a method, performed in an Online Charging System (OCS) for managing subscription by a Policy and Charging Rules Function(PCRF) to a policy counter maintained at the OCS, wherein the OCS is operable to communicate with the PCRF over an Sy reference point. The method comprises receiving a Spending Limit Request (SLR) command from the PCRF, the SLR command specifying an identifier of a policy counter and specifying application of the SLR command to all ongoing Sy sessions between the PCRF and the OCS; and applying the received SLR command with respect to the specified policy counter identifier to each ongoing Sy session between the OCS and the PCRF.

According to examples of the invention, the method may further comprise sending a Spending Limit Answer (SLA) to the PCRF, the SLA confirming application of the SLR command to all ongoing Sy sessions between the PCRF and the OCS.

According to examples of the invention, a Spending Limit Request Type Attribute Value Pair (AVP) of the SLR command may be set to one of SUBSCRIBE_ALL or REMOVE_ALL.

According to examples of the invention, if the Spending Limit Request Type AVP of the SLR command is set to SUBSCRIBE_ALL, applying the received SLR command with respect to the specified policy counter identifier to each ongoing Sy session between the OCS and the PCRF may comprise, for each ongoing Sy session between the OCS and the PCRF, checking whether the specified policy counter identifier is already present in an Sy session list of policy counter identifiers for which status update notifications are to be sent to the PCRF for that Sy session; if the specified policy counter identifier is already present in the Sy session list, making no change to the list, and if the specified policy counter identifier is not already present in the Sy session list, adding the specified policy counter identifier to the Sy session list.

According to examples of the invention, if the Spending Limit Request Type AVP of the SLR command is set to REMOVE_ALL, applying the received SLR command with respect to the specified policy counter identifier to each ongoing Sy session between the OCS and the PCRF may comprise, for each ongoing Sy session between the OCS and the PCRF, checking whether the specified policy counter identifier is present in an Sy session list of policy counter identifiers for which status update notifications are to be sent to the PCRF for that Sy session; if the specified policy counter identifier is not present in the Sy session list, making no change to the list, and if the specified policy counter identifier is present in the Sy session list, removing the specified policy counter identifier from the Sy session list.

According to another aspect of the present invention, there is provided a computer program product configured, when run on a computer, to carry out a method according to the first or second aspects of the present invention.

According to another aspect of the present invention, there is provided a Policy and Charging Rules Function (PCRF) for managing subscription to a policy counter maintained at an Online Charging System (OCS) wherein the PCRF is operable to communicate with the OCS over an Sy reference point, the PCRF comprising a processor and a memory, the memory containing instructions executable by the processor such that the PCRF is operable to carry out a method according to the first aspect of the present invention.

According to another aspect of the present invention, there is provided an Online Charging System (OCS) for managing subscription by a Policy and Charging Rules Function (PCRF) to a policy counter maintained at the OCS, wherein the OCS is operable to communicate with the PCRF over an Sy reference point, the OCS comprising a processor and a memory, the memory containing instructions executable by the processor such that the OCS is operable to carry out a method according to the second aspect of the present invention.

According to another aspect of the present invention, there is provided a Policy and Charging Rules Function (PCRF) for managing subscription to a policy counter maintained at an Online Charging System (OCS) wherein the PCRF is operable to communicate with the OCS over an Sy reference point. The PCRF comprises a subscription trigger unit configured to receive an All Users subscription trigger from a network operator, the All Users subscription trigger identifying a network policy; and a Spending Limit Request unit configured to send a Spending Limit Request (SLR) command to the OCS, the SLR command specifying an identifier of a policy counter for the network policy and specifying application of the SLR command to all ongoing Sy sessions between the PCRF and the OCS.

According to examples of the invention, the Spending Limit Request unit is further configured to receive a Spending Limit Answer (SLA) from the OCS, the SLA confirming application of the SLR command to all ongoing Sy sessions between the PCRF and the OCS.

According to examples of the invention, the PCRF may further comprise a record unit configured to update an internal record for each ongoing Sy session between the PCRF and the OCS with application of the SLR command.

According to examples of the invention, the record unit may be configured to update an internal record for each ongoing Sy session between the PCRF and the OCS with application of the SLR command by, for each ongoing Sy session between the PCRF and the OCS, performing one of adding or removing the specified policy counter identifier to or from a list of policy counter identifiers for which the PCRF will receive status update notifications from the OCS for that Sy session.

According to examples of the invention, the Spending Limit Request unit may be configured to specify application of the SLR command to all ongoing Sy sessions between the PCRF and the OCS by setting a Spending Limit Request Type Attribute Value Pair (AVP) of the SLR command to one of SUBSCRIBE_ALL or REMOVE_ALL.

According to examples of the invention, the subscription trigger unit may be configured to receive an All Users subscription trigger specifying one of provision or removal of the identified network policy; if the All Users subscription trigger specifies provision of the identified network policy, the Spending Limit Request unit may be configured to specify application of the SLR command to all ongoing Sy sessions between the PCRF and the OCS by setting a Spending Limit Request Type AVP of the SLR command to SUBSCRIBE_ALL, and if the All Users subscription trigger specifies removal of the identified network policy, the Spending Limit Request unit may be configured to specify application of the SLR command to all ongoing Sy sessions between the PCRF and the OCS by setting a Spending Limit Request Type AVP of the SLR command to REMOVE_ALL.

According to another aspect of the present invention, there is provided an Online Charging System (OCS) for managing subscription by a Policy and Charging Rules Function (PCRF) to a policy counter maintained at the OCS, wherein the OCS is operable to communicate with the PCRF over an Sy reference point. The OCS comprises a Spending Limit Request unit configured to receive a Spending Limit Request (SLR) command from the PCRF, the SLR command specifying an identifier of a policy counter and specifying application of the SLR command to all ongoing Sy sessions between the PCRF and the OCS; and an application unit configured to apply the received SLR command with respect to the specified policy counter identifier to each ongoing Sy session between the OCS and the PCRF.

According to examples of the invention, the Spending Limit Request unit may be further configured to send a Spending Limit Answer (SLA) to the PCRF, the SLA confirming application of the SLR command to all ongoing Sy sessions between the PCRF and the OCS.

According to examples of the invention, the Spending Limit Request unit may be configured to receive an SLR command in which a Spending Limit Request Type Attribute Value Pair (AVP) is set to one of SUBSCRIBE_ALL or REMOVE_ALL.

According to examples of the invention, the application unit may comprise a checking unit and an update unit, and, if the Spending Limit Request Type AVP of the SLR command is set to SUBSCRIBE_ALL, then for each ongoing Sy session between the OCS and the PCRF, the checking unit may be configured to check whether the specified policy counter identifier is already present in an Sy session list of policy counter identifiers for which status update notifications are to be sent to the PCRF for that Sy session; if the specified policy counter identifier is already present in the Sy session list, the update unit may be configured to make no change to the list, and if the specified policy counter identifier is not already present in the Sy session list, the update unit may be configured to add the specified policy counter identifier to the Sy session list.

According to examples of the invention, the application unit may comprise a checking unit and an update unit, and, if the Spending Limit Request Type AVP of the SLR command is set to REMOVE_ALL, then for each ongoing Sy session between the OCS and the PCRF, the checking unit may be configured to check whether the specified policy counter identifier is present in an Sy session list of policy counter identifiers for which status update notifications are to be sent to the PCRF for that Sy session; if the specified policy counter identifier is not present in the Sy session list, the update unit may be configured to make no change to the list, and if the specified policy counter identifier is present in the Sy session list, the update unit may be configured to remove the specified policy counter identifier from the Sy session list.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
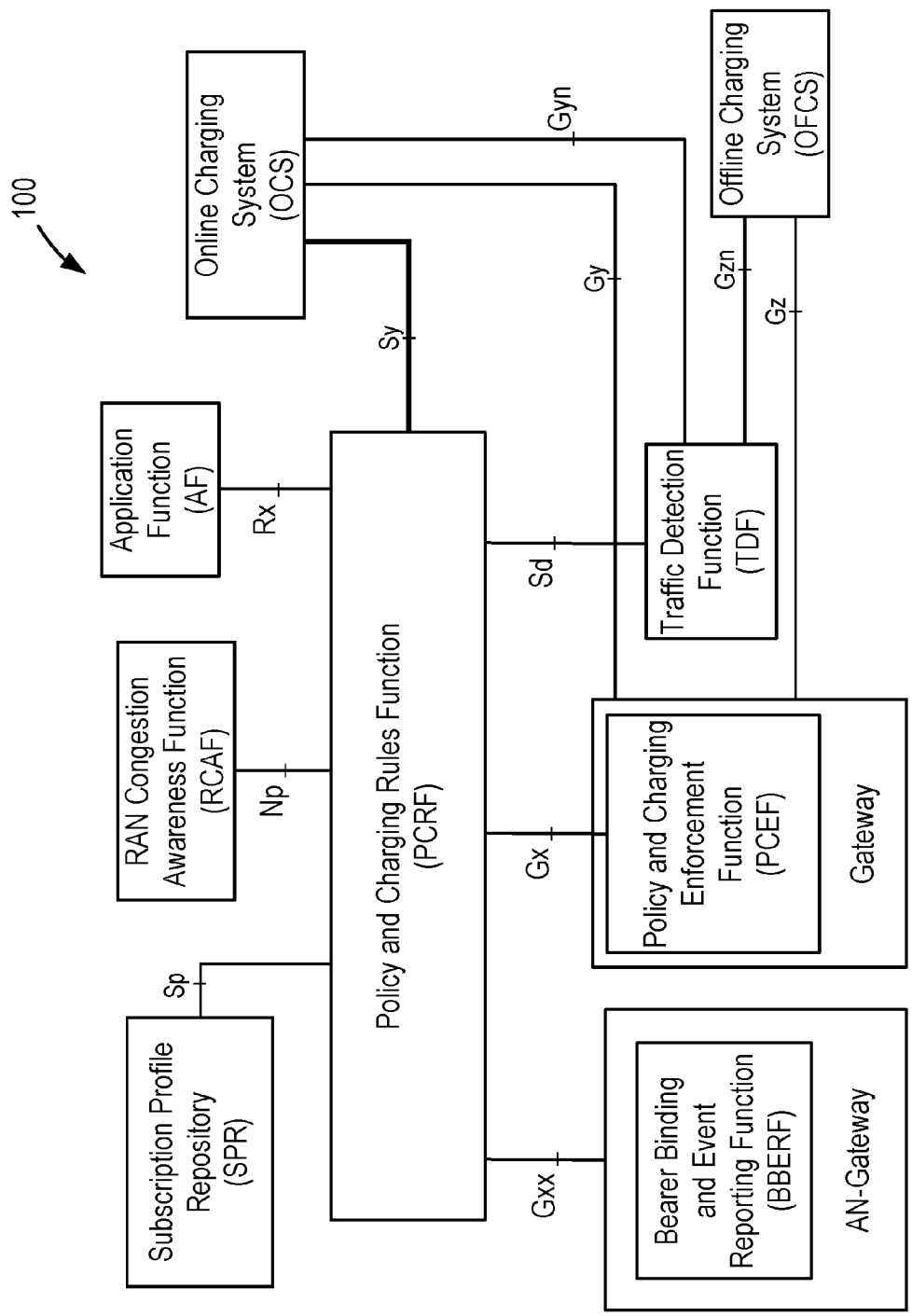
FIG. 1 is a representation of a reference network architecture.

Aspects of the present invention provide methods, performed at a PCRF and an OCS, which enable subscription or un-subscription to/from one or more policy counters for all ongoing Sy sessions between the PCRF and OCS using a single signalling request. A subscription trigger is received by the PCRF which specifies actions relating to one or more policy counters that should apply to all network users, as opposed to just a single user as is the case in existing protocols. The PCRF then sends a Spending Limit Request (SLR) command which identifies the relevant policy counter or counters and applies to all ongoing Sy sessions. The OCS cooperates with the PCRF to enable the PCRF to subscribe or unsubscribe to/from the policy counter or counters for all ongoing Sy sessions as a consequence of receiving the single SLR command. Together the PCRF and OCS thus enable the bulk subscription or un-subscription to/from a policy counter or counters for all ongoing Sy sessions using a single SLR command, avoiding the signalling burst that is otherwise caused if an individual SLR command must be sent for each ongoing Sy session.

Examples of the present invention provide the above discussed functionality by introducing two new SLR command types for use in signalling over the Sy interface. According to TS 29.219, Section 5.3.4, the Spending Limit Request Type (SL-Request-Type) Attribute Value Pair (AVP) informs the OCS whether an SLR command is being sent as part of an Initial or an Intermediate spending limit procedure. The SL-Request-Type AVP may thus take either of the following values:

INITIAL_REQUEST (0), or
INTERMEDIATE_REQUEST (1).

Examples of the present invention introduce two new SL-Request-Type AVP values:

SUBSCRIBE_ALL (2), and
REMOVE_ALL (3).

According to examples of the invention, when an SL-Request-Type AVP has value SUBSCRIBE_ALL or REMOVE_ALL, there may be no changes to the Message format of the SL-Request. As SLR commands having an SL-Request-Type AVP SUBSCRIBE_ALL or REMOVE_ALL apply to all ongoing Sy sessions, a Subscription-Id AVP is Optional and need not be sent in the SLR command. If a subscription-Id is sent with the SLR command, it will be ignored by the OCS. At least one Policy-Counter-Identifier AVP should be sent with SLR commands having an SL-Request-Type AVP SUBSCRIBE_ALL or REMOVE_ALL, indicating to which policy counter or counters the command applies.

Behavior of the PCRF according to aspects of the present invention is discussed below with reference to FIG. 2. In brief, the PCRF makes use of the new SL-Request-Type AVPs when it receives a trigger that applies to all ongoing Sy sessions. The trigger may indicate one or more policy counters, and may indicate bulk subscription to the counter or counters, or bulk un-subscription from the counter or counters. If bulk subscription is triggered, the PCRF sets the SL-Request-Type AVP as SUBSCRIBE_ALL (2). If bulk un-subscription is triggered, the PCRF sets the SL-Request-Type AVP as REMOVE_ALL (3). Internally, the PCRF handles the bulk subscription or un-subscription to/from a policy counter or counters by iterating through each of its ongoing Sy sessions, treating each session as if subscription or un-subscription had been triggered for that session and requested using an INTERMEDIATE_REQUEST SLR command. No new session is created for the SUBSCRIBE_ALL or REMOVE_ALL SLR commands, as each bulk command is internally mapped to the ongoing Sy sessions. The initiation and termination of Sy sessions using Initial and Final SLR commands is unchanged.

Figure 2:
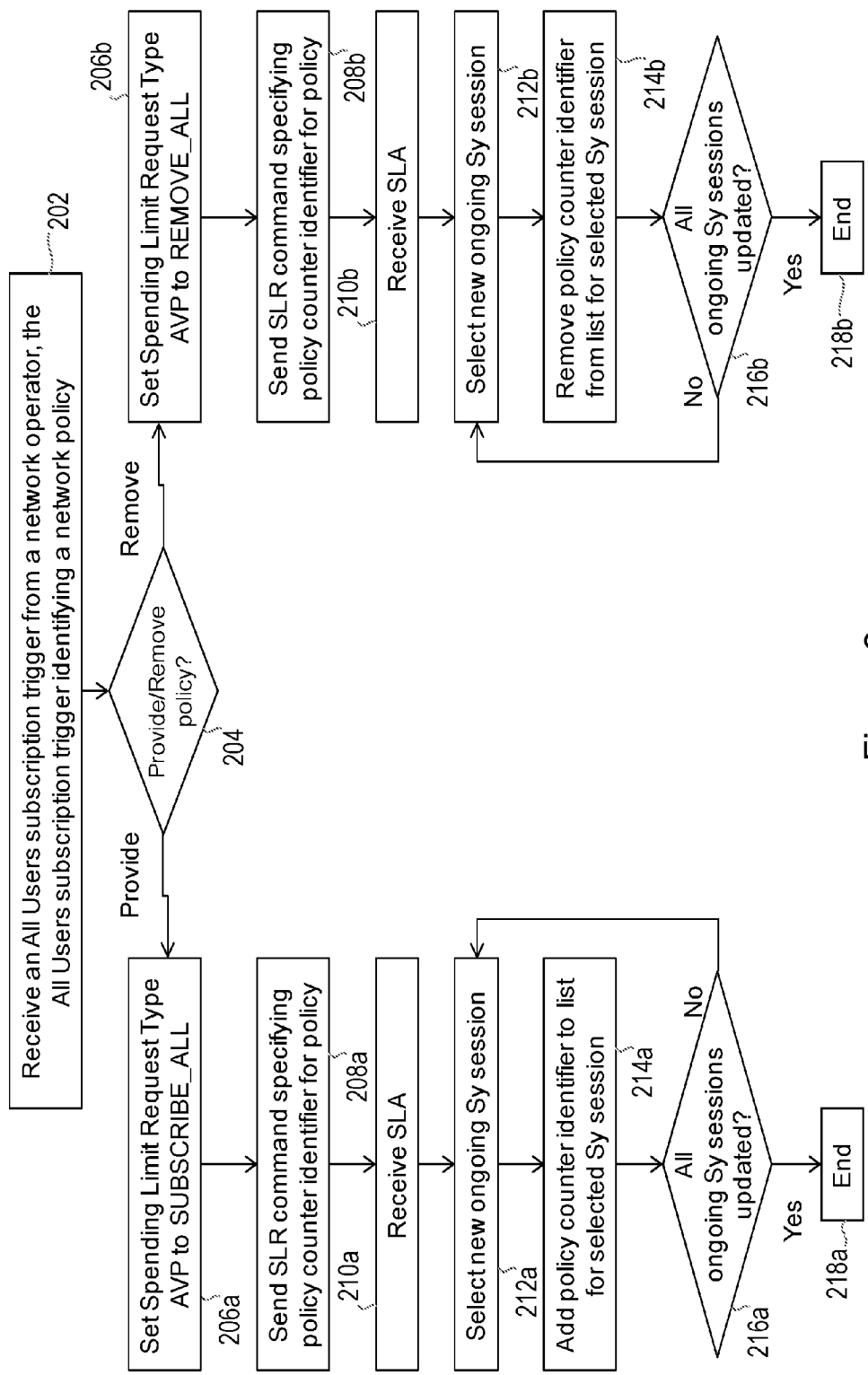
FIG. 2 is a flow chart illustrating process steps in a method for managing subscription to a policy counter maintained at an OCS.

FIG. 2 is a flow chart illustrating process steps in an example method 200 performed at a PCRF for managing subscription to a policy counter maintained at an OCS. The method 200 includes the step of receiving an All Users subscription trigger from a network operator in step 202, the All Users subscription trigger identifying a network policy. The method 200 also includes the step of sending an SLR command to the OCS in step 208, the SLR command specifying an identifier of a policy counter for the network policy and specifying application of the SLR command to all ongoing Sy sessions between the PCRF and the OCS. The method 200 may also include additional steps, as set out below.

Referring to FIG. 2, in a first step 202, the PCRF receives an All Users subscription trigger from a network operator. This trigger indicates that it applies to all network users, in contrast to existing subscription triggers that apply to a specific user. The All Users subscription trigger identifies a network policy and may identify several network policies. On receipt of the All Users subscription trigger, the PCRF then determines, at step 204, whether the trigger is indicating provision or removal of the identified policy or policies. If the trigger indicates provision of the policy or policies, the PCRF then sets an SL-Request-Type of an SLR command to be SUBSCRIBE_ALL in step 206a. The PCRF then sends the SLR command to its cooperating OCS in step 208a, including in the SLR command a policy counter identifier for the or each of the network policies specified in the All Users subscription trigger. In step 210a, the PCRF receives an SLA from the OCS, confirming that the requested action has been taken. The PCRF then proceeds to internally map the SUBSCRIBE_ALL command sent to the OCS to each of the existing Sy sessions between the PCRF and the OCS. In step 212a, the PCRF selects an ongoing Sy session. In step 214a, the PCRF adds the or each policy counter identifier included in the SLR command sent to the OCS to a list of policy counters for which updates are to be received for the selected Sy session. In step 216a, the PCRF checks whether it has updated its internal lists of all ongoing Sy sessions. If all ongoing Sy sessions have not yet been updated, the PCRF returns to step 212a to select a new Sy session and add the or each policy counter identifier to the session list. When all ongoing Sy sessions have been updated, the process terminates at step 218a.

If the All Users trigger received at step 202 indicates removal of the indicated policy or policies, the PCRF follows a similar procedure to that described above to unsubscribe from the policy counters for the indicated policies for all ongoing Sy sessions. At step 206b, the PCRF sets an SL-Request-Type of an SLR command to be REMOVE_ALL. The PCRF then sends the SLR command to its cooperating OCS in step 208b, including in the SLR command a policy counter identifier for the or each of the network policies specified in the All Users subscription trigger. In step 210b, the PCRF receives an SLA from the OCS, confirming that the requested action has been taken. The PCRF then proceeds to internally map the REMOVE_ALL command sent to the OCS to each of the existing Sy sessions between the PCRF and the OCS. In step 212b, the PCRF selects an ongoing Sy session. In step 214b, the PCRF removes the or each policy counter identifier included in the SLR command sent to the OCS from the list of policy counters for which updates are to be received for the selected Sy session. In step 216b, the PCRF checks whether it has updated its internal lists of all ongoing Sy sessions. If all ongoing Sy sessions have not yet been updated, the PCRF returns to step 212b to select a new Sy session and remove the or each policy counter identifier from the session list. When all ongoing Sy sessions have been updated, the process terminates at step 218b.

Figure 3:
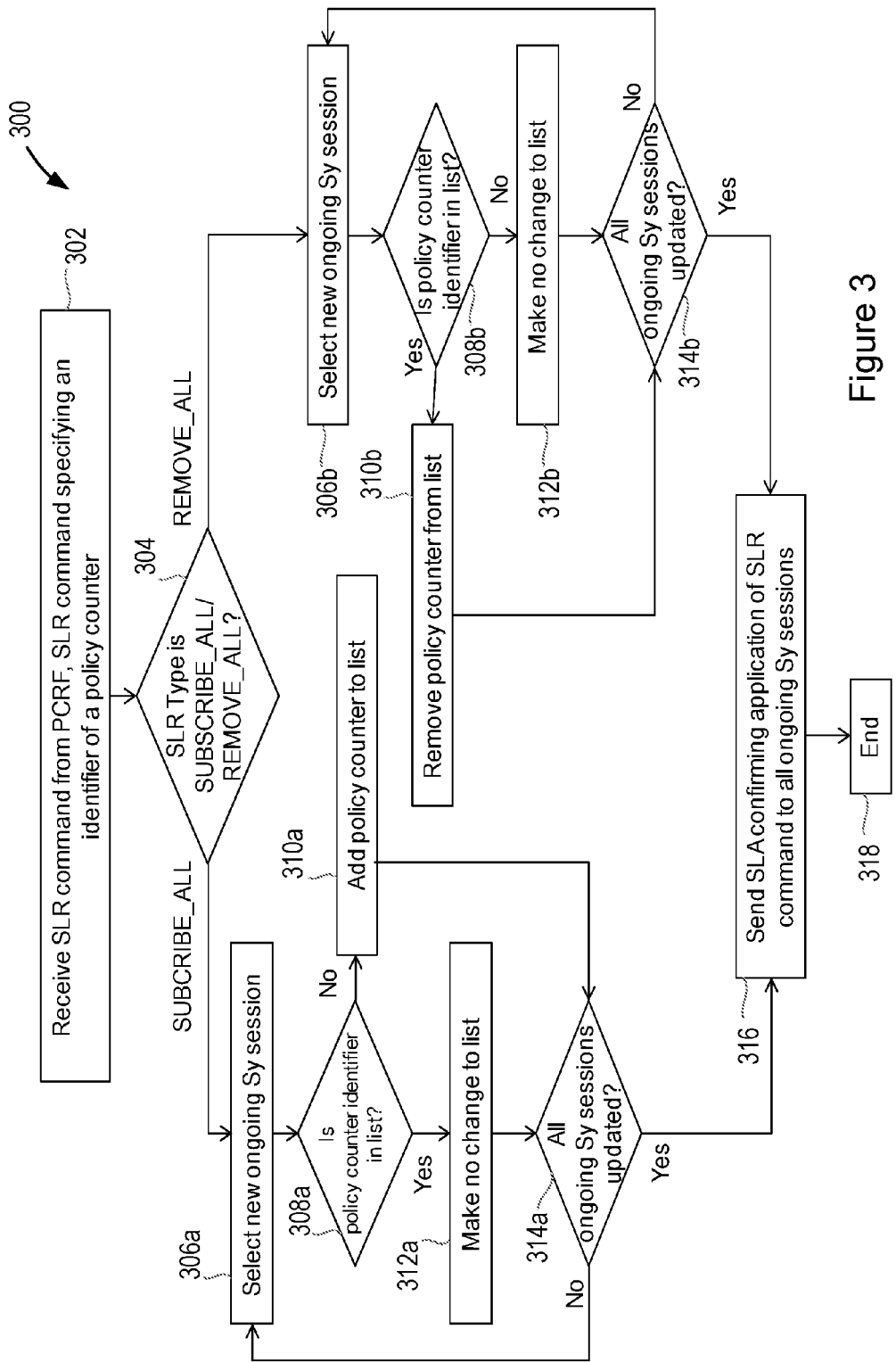
FIG. 3 is a flow chart illustrating process steps in another method for managing subscription to a policy counter maintained at an OCS.

Behavior of the OCS according to examples of the invention is now described, with reference to FIG. 3. In brief, when the OCS receives an SLR command with SL-Request-Type AVP SUBSCRIBE_ALL, the OCS updates the Policy Counter Identifier list for all ongoing Sy sessions by adding the newly received policy counter identifier or identifiers to each list. When the OCS receives an SLR command with SL-Request-Type AVP REMOVE_ALL, the OCS updates the Policy Counter Identifier list for all ongoing Sy sessions by removing the newly received policy counter identifier or identifiers from each list. The OCS handles this bulk subscription/un-subscription to/from policy counters by internally iterating through each ongoing session. A SUBSCRIBE_ALL or REMOVE_ALL SLR command is thus treated as multiple individual INTERMEDIATE_REQUEST commands. It will be appreciated that the OCS merely adds or removes policy counter identifiers included in the bulk SLR commands, and does not change any other existing entries in the policy counter identifier list for each ongoing session.

When the OCS receives an SLR command with SL-Request-Type AVP SUBSCRIBE_ALL, the OCS deals with exceptional circumstances such as 'Not Applicable to Subscriber' or 'Unknown Counter Identifier' in the same way as it deals with these circumstances for an INTERMEDIATE_REQUEST. When the OCS receives an SLR command with SL-Request-Type AVP REMOVE_ALL, if any of the ongoing sessions do not have the specified policy counter identifier or identifiers in the list, the OCS simply ignores that session and continues with the next session. This may be the case for example if that particular policy counter identifier has never been added for a particular user, or has already been removed for that user via an Intermediate request. No new Sy session is created or maintained by the OCS to manage the new SLR request types, as each new request type is internally mapped by the OCS to existing Sy sessions. The procedure for initiating and terminating Sy sessions using Initial and Final SLR commands also remains unchanged.

FIG. 3 is a flow chart illustrating process steps in an example method 300 performed at an OCS for managing subscription by a PCRF to a policy counter maintained at the OCS. The method 300 includes the step of receiving an SLR command from the PCRF at step 302, the SLR command specifying an identifier of a policy counter and specifying application of the SLR command to all ongoing Sy sessions between the PCRF and the OCS. The method 300 also includes the step of applying the received SLR command with respect to the specified policy counter identifier to each ongoing Sy session between the OCS and the PCRF at steps 306 to 314. The method 300 may also include additional steps, as set out below.

Referring to FIG. 3, in a first step 302, the OCS receives an SLR command from the PCRF. The SLR command specifies a policy counter identifier and may specify multiple policy counter identifiers. The OCS then checks, at step 304, whether the SL-Request-Type AVP is SUBSCRIBE_ALL or REMOVE_ALL. If the SL-Request-Type AVP is SUBSCRIBE_ALL then the OCS proceeds to apply the command by iterating through all ongoing Sy sessions and adding the policy counter identifier or identifiers to each ongoing Sy session list. In step 306a, the OCS selects an ongoing Sy session, and in step 308a, the OCS checks whether the policy counter identifier or identifiers from the SLR command are already in the list for the currently selected Sy session. If one or more of the policy counter identifiers are not in the list, the OCS adds these policy counter identifiers to the list at step 310a. If the policy counter identifiers are already in the list, then no change is made to the list at step 312a. The effect of these steps is thus to add any and all of the policy counter identifiers received with the SLR command which are not already present in an ongoing Sy session list to the Sy session list, while leaving other list entries unchanged. In step 314a, the OCS checks whether all ongoing Sy sessions have been updated. If all ongoing Sy sessions have not yet been updated, the OCS returns to step 306a to select a new Sy session and update the session in steps 308a to 312a. When all ongoing Sy sessions have been updated, the OCS sends a Spending Limit Answer in step 316, confirming that the SLR command received in step 302 has been applied to all ongoing Sy sessions. The process then terminates at step 318.

If the SL-Request-Type AVP of the SLR command received in step 302 is REMOVE_ALL then the OCS follows a similar procedure to that described above to apply the command by iterating through all ongoing Sy sessions and removing the policy counter identifier or identifiers from each ongoing Sy session list. In step 306b, the OCS selects an ongoing Sy session, and in step 308b, the OCS checks whether the policy counter identifier or identifiers from the SLR command are already in the list for the currently selected Sy session. If one or more of the policy counter identifiers are in the list, the OCS removes these policy counter identifiers from the list at step 310b. If the policy counter identifiers are not present in the list, then no change is made to the list at step 312b. The effect of these steps is thus to remove any and all of the policy counter identifiers received with the SLR command which are present in an ongoing Sy session list from the Sy session list, while leaving other list entries unchanged. In step 314b, the OCS checks whether all ongoing Sy sessions have been updated. If all ongoing Sy sessions have not yet been updated, the OCS returns to step 306b to select a new Sy session and update the session in steps 308b to 312b. When all ongoing Sy sessions have been updated, the OCS sends a Spending Limit Answer in step 316, confirming that the SLR command received in step 302 has been applied to all ongoing Sy sessions. The process then terminates at step 318.

Figure 4:
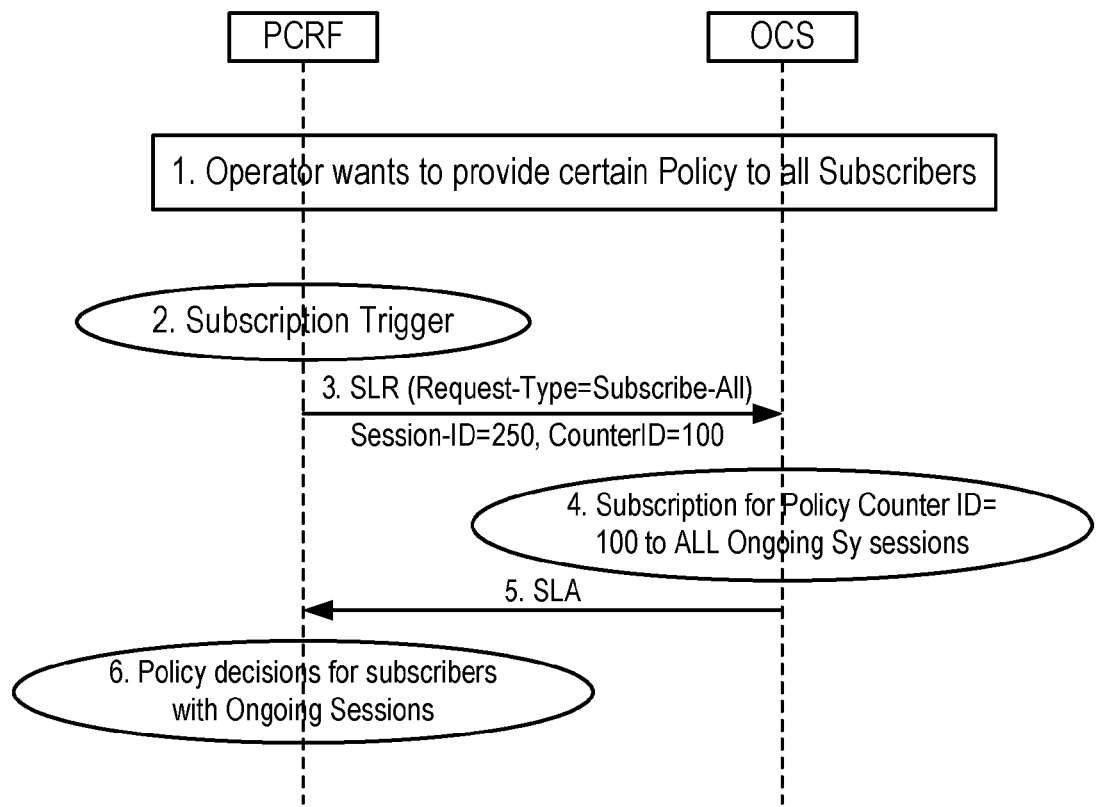
FIGS. 4 to 6 illustrate command flows between a PCRF and an OCS.
Figure 5:
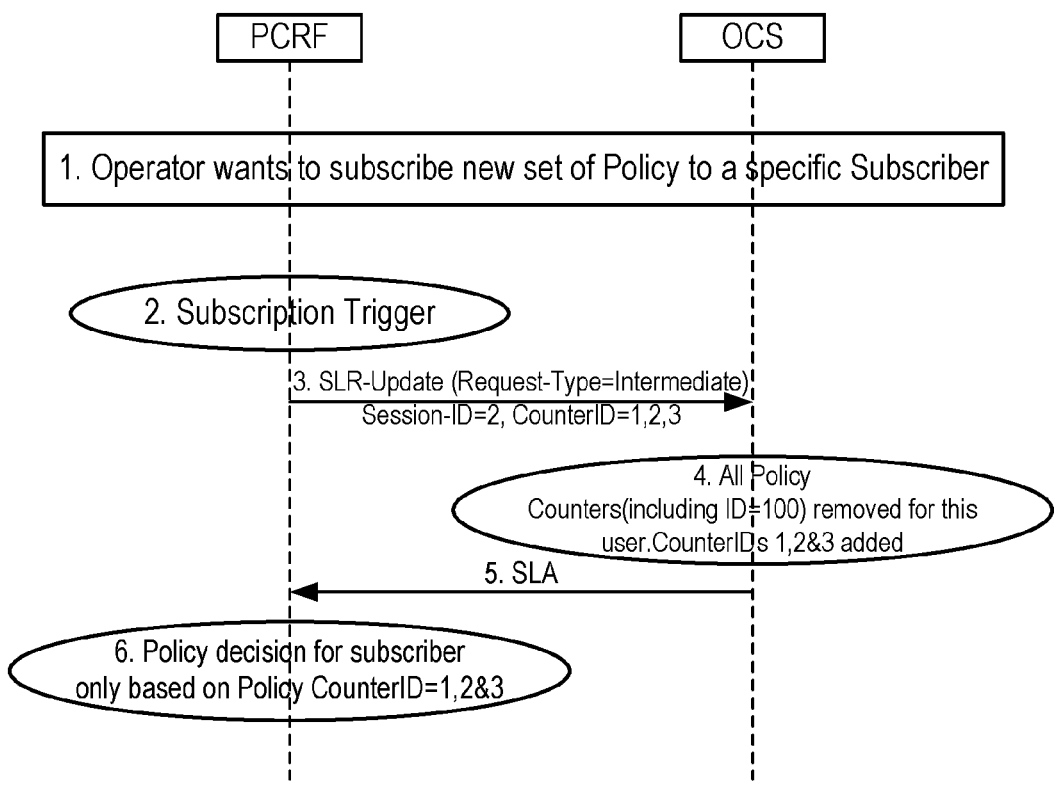
Figure 6:
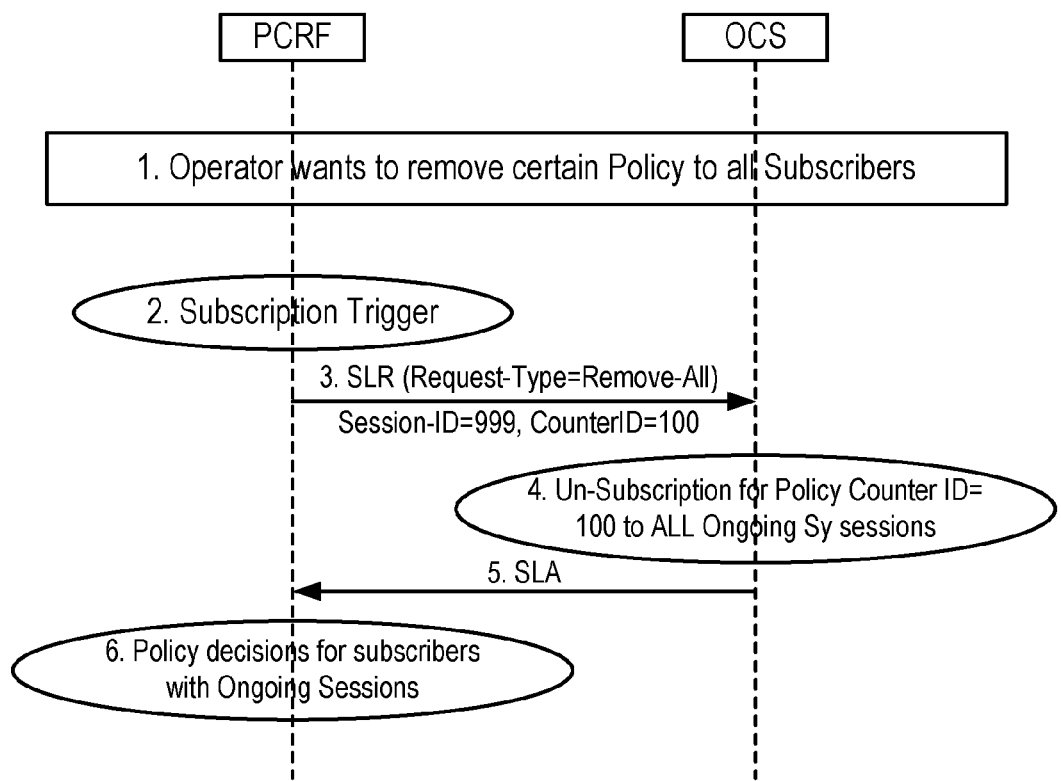

FIGS. 4 to 6 illustrate command flow between a PCRF and OCS for three different SLR command types. FIG. 4 illustrates command flow for a SUBSCRIBE_ALL SLR command, FIG. 5 illustrates command flow for an INTERMEDIATE_REQUEST SLR command and FIG. 6 illustrates command flow for a REMOVE_ALL SLR command.

Referring to FIG. 4, a scenario is illustrated in which an operator wishes to provide a certain Policy, illustrated as Policy Counter Identifier 100, to all Users. This is illustrated as stage 1. The provisioning of the Policy Counter at the PCRF and OCS is conducted according to the current standards. In stage 2 a Spending Limit Request Report procedure for all ongoing sessions is triggered at the PCRF for the subscription of Policy Counter Identifier 100. This new request trigger enables the PCRF to distinguish between triggering of an individual User Spending Limit Request Procedure and triggering of an All Users Spending Limit Request Procedure. In stage 3, the PCRF sends an SLR Command to the OCS with SL-Request-Type SUBSCRIBE_ALL. Included in the SLR command is the Policy Counter Identifier 100. In stage 4, upon receipt of the SLR command with SL-Request-Type SUBSCRIBE_ALL, the OCS acts upon the Policy Counter Identifier 100 as if it had been received per user in a series of individual Intermediate requests, adding the Policy Counter Identifier 100 to all ongoing Sy sessions in which it does not already appear. In stage 5, the OCS sends a Spending Limit Answer to PCRF. In stage 6, the PCRF acts upon the Policy Counter Identifier 100 for all ongoing sessions sessions as if it had subscribed to the Policy Counter Identifier using multiple individual Intermediate requests, one for each ongoing session.

FIG. 5 illustrates a situation in which the operator wishes to subscribe to a set of Policy Counters for an individual user for whom an Sy session is ongoing. This is illustrated as stage 1 and takes place after completion of the command flow illustrated in FIG. 4. Individual user subscription and un-subscription is unaffected by the introduction of the new methods according to aspects of the invention, and proceeds using an Intermediate request according to the current standards. In stage 2, the Spending Limit Request Report procedure for the individual user is triggered at the PCRF for the un-subscription of earlier Policy Counter Identifiers and subscription to new Policy Counter Identifiers. In stage 3, an SLR command is sent to the OCS with SL-Request-Type INTERMEDIATE_REQUEST and identifying Policy Counter Identifiers 1, 2 and 3. In stage 4, upon receipt of the SLR command, the OCS acts upon earlier subscribed Policy Counter Identifiers for the user, including the Policy Counter Identifier 100. The existing Policy Counter Identifier list for the User, including Policy Counter Identifier 100, is replaced with the new Policy Counter Identifiers 1, 2 and 3 included in the Intermediate request. Policy Counter Identifier 100 is thus un-subscribed, together with all other existing Policy Counter Identifiers in the User's list. In stage 5, a Spending Limit Answer is sent back to PCRF and in stage 6 the PCRF updates its internal record for the User accordingly.

FIG. 6 illustrates a situation in which the operator wishes to remove a certain policy, in the illustrated case Policy Counter Identifier 100, for all Users. This is illustrated as stage 1 and takes place after completion of the command flow illustrated in FIG. 5. The provisioning of the Policy Counter at the PCRF and OCS is conducted according to the current standards. In stage 2, the Spending Limit Request Report procedure for all ongoing sessions is triggered at the PCRF for the un-subscription of Policy Counter Identifier 100. As in the command flow of FIG. 4, this new request trigger enables the PCRF to distinguish between triggering of individual User Spending Limit Request Procedure and triggering of All Users Spending Limit Request Procedure.

In stage 3, the PCRF sends an SLR command to the OCS with SL-Request-Type REMOVE_ALL. In stage 4, upon receipt of the SLR command with SL-Request-Type REMOVE_ALL, the OCS acts upon the Policy Counter Identifier 100 as if it has been received per user in a series of Intermediate requests. Policy Counter Identifier 100 is therefore removed from ongoing Sy sessions. If this Policy Counter Identifier has not been added, or has already been removed for some sessions, as for example the User of the command flow shown in FIG. 5, these sessions are ignored by the OCS, their lists remaining unchanged. In stage 5, a Spending Limit Answer is sent back to the PCRF. In stage 6, the PCRF acts upon the Policy Counter Identifier 100 for all individual users having ongoing sessions as if the Policy Counter Identifier 100 had been un-subscribed per user with multiple individual Intermediate commands.

Figure 7:
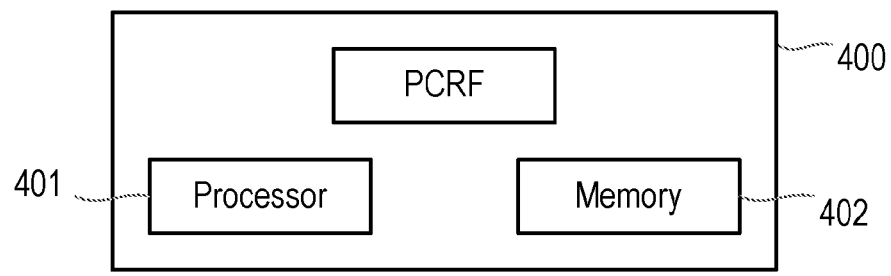
FIG. 7 is a block diagram illustrating functional units in a PCRF.
Figure 8:
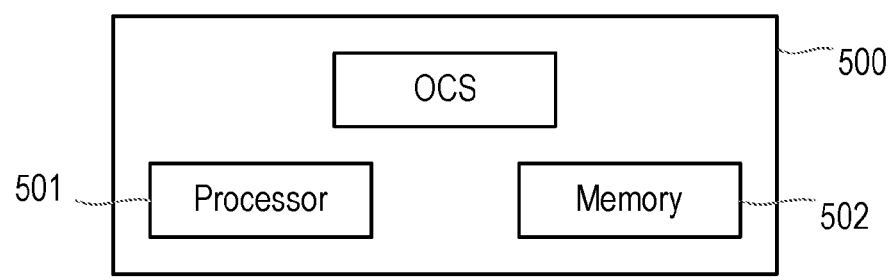
FIG. 8 is a block diagram illustrating functional units in an OCS.

The methods of the present invention, as illustrated by the above examples and command flows, may be conducted in a PCRF or OCS. The methods may be conducted on receipt of suitable computer readable instructions, which may be embodied within a computer program running on the PCRF or OCS. FIGS. 7 and 8 illustrate first examples of PCRF and OCS which may execute the methods of the present invention, for example on receipt of suitable instructions from a computer program. Referring to FIGS. 7 and 8, each of the PCRF 400 and OCS 500 comprises a processor 401, 501, and a memory 402, 502. The memory 402, 502 contains instructions executable by the processor 401, 501 such that the PCRF 400 is operative to carry out examples of the method 200, and the OCS 500 is operative to carry out examples of the method 300.

Figure 9:
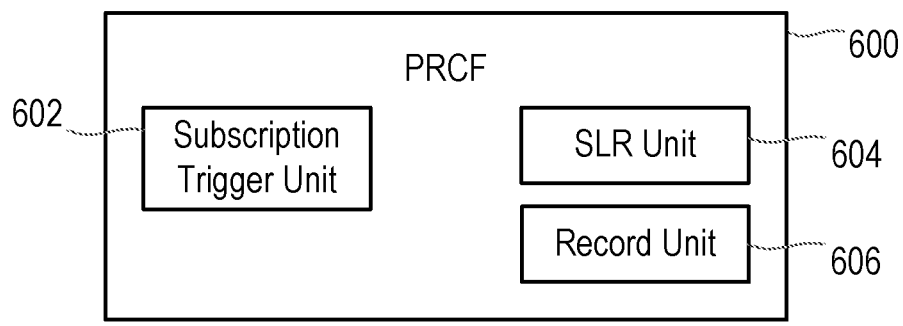
FIG. 9 is a block diagram illustrating functional units in another example of PCRF.

FIG. 9 illustrates functional units in another embodiment of PCRF 600 which may execute the method 200, for example according to computer readable instructions received from a computer program. It will be understood that the units illustrated in FIG. 9 are functional units, and may be realised in any appropriate combination of hardware and/or software.

Referring to FIG. 9, the PCRF 600 comprises a subscription trigger unit 602 configured to receive an All Users subscription trigger from a network operator, the All Users subscription trigger identifying a network policy. The PCRF 600 also comprises a Spending Limit Request unit 604 configured to send an SLR command to the OCS, the SLR command specifying an identifier of a policy counter for the network policy and specifying application of the SLR command to all ongoing Sy sessions between the PCRF and the OCS. The SLR unit 604 may be configured to specify application of the SLR command to all ongoing Sy sessions between the PCRF and the OCS by setting a Spending Limit Request Type AVP of the SLR command to one of SUBSCRIBE_ALL or REMOVE_ALL. The SLR unit 604 may be further configured to receive an SLA from the OCS, the SLA confirming application of the SLR command to all ongoing Sy sessions between the PCRF and the OCS.

Some examples of PCRF may further comprise a record unit 606 configured to update an internal record for each ongoing Sy session between the PCRF and the OCS with application of the SLR command. The record unit 606 may be configured to update an internal record for each ongoing Sy session between the PCRF and the OCS with application of the SLR command by, for each ongoing Sy session between the PCRF and the OCS, performing one of adding or removing the specified policy counter identifier to or from a list of policy counter identifiers for which the PCRF will receive status update notifications from the OCS for that Sy session.

The subscription trigger unit 602 may be configured to receive an All Users subscription trigger specifying one of provision or removal of the identified network policy. If the All Users subscription trigger specifies provision of the identified network policy, the SLR unit 604 may be configured to specify application of the SLR command to all ongoing Sy sessions between the PCRF and the OCS by setting a Spending Limit Request Type AVP of the SLR command to SUBSCRIBE_ALL. If the All Users subscription trigger specifies removal of the identified network policy, the SLR unit 604 may be configured to specify application of the SLR command to all ongoing Sy sessions between the PCRF and the OCS by setting a Spending Limit Request Type AVP of the SLR command to REMOVE_ ALL.

Figure 10:
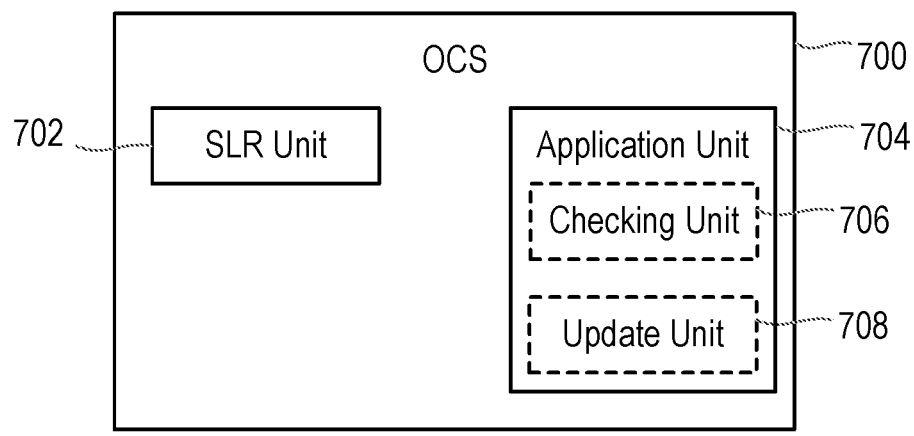
FIG. 10 is a block diagram illustrating functional units in another example of OCS.

FIG. 10 illustrates functional units in another embodiment of OCS 700 which may execute the method 300, for example according to computer readable instructions received from a computer program. It will be understood that the units illustrated in FIG. 10 are functional units, and may be realised in any appropriate combination of hardware and/or software.

Referring to FIG. 10, the OCS comprises a Spending Limit Request unit 702 configured to receive an SLR command from the PCRF, the SLR command specifying an identifier of a policy counter and specifying application of the SLR command to all ongoing Sy sessions between the PCRF and the OCS. The OCS also comprises an application unit 704 configured to apply the received SLR command with respect to the specified policy counter identifier to each ongoing Sy session between the OCS and the PCRF. The SLA unit 702 may be configured to receive an SLR command in which a Spending Limit Request Type AVP is set to one of SUBSCRIBE_ALL or REMOVE_ALL. The SLA unit 702 may be further configured to send a Spending Limit Answer to the PCRF, the SLA confirming application of the SLR command to all ongoing Sy sessions between the PCRF and the OCS.

The application unit 704 may comprise a checking unit 706 and an update unit 708. If the Spending Limit Request Type AVP of the SLR command is set to SUBSCRIBE_ALL then, for each ongoing Sy session between the OCS and the PCRF, the checking unit 706 may be configured to check whether the specified policy counter identifier is already present in an Sy session list of policy counter identifiers for which status update notifications are to be sent to the PCRF for that Sy session. If the specified policy counter identifier is already present in the Sy session list, the update unit 708 may be configured to make no change to the list. If the specified policy counter identifier is not already present in the Sy session list, the update unit 708 may be configured to add the specified policy counter identifier to the Sy session list.

If the Spending Limit Request Type AVP of the SLR command is set to REMOVE_ALL then, for each ongoing Sy session between the OCS and the PCRF, the checking unit 706 may be configured to check whether the specified policy counter identifier is present in an Sy session list of policy counter identifiers for which status update notifications are to be sent to the PCRF for that Sy session. If the specified policy counter identifier is not present in the Sy session list, the update unit 708 may be configured to make no change to the list. If the specified policy counter identifier is present in the Sy session list, the update unit 708 may be configured to remove the specified policy counter identifier from the Sy session list.

Aspects of the present invention thus provide methods and apparatus for managing subscription by a PCRF to policy counters maintained at an OCS. The methods and apparatus enable bulk subscription or un-subscription to/from one or more policy counters for all ongoing sessions between the PCRF and OCS in a single SLR command. The methods and apparatus disclosed herein thus avoid the signalling burst that is otherwise caused when a network policy is applied to or removed from all network users. The methods described herein are backwards compatible in that they do not impact existing communication protocol between a PCRF and OCS for Initial, Intermediate or Final SLR requests. In addition, the SLR messages introduced according to examples of the present disclosure are mapped to existing Sy sessions, enabling the PCRF and OCS to manage the messages, and to monitor and report policy counters in a manner consistent with existing standard documents.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

We claim:

1. A method performed in a Policy and Charging Rules Function (PCRF) for managing subscription to a policy counter maintained at an Online Charging System (OCS), wherein the PCRF is operable to communicate with the OCS over an Sy reference point, the method comprising:
    receiving an All Users subscription trigger from a network operator, the All Users subscription trigger identifying a network policy; and
    sending a Spending Limit Request (SLR) command to the OCS, the SLR command specifying an identifier of a policy counter for the network policy and specifying application of the SLR command to all ongoing Sy sessions between the PCRF and the OCS.

2. The method of claim 1, further comprising receiving a Spending Limit Answer (SLA) from the OCS, the SLA confirming application of the SLR command to all ongoing Sy sessions between the PCRF and the OCS.

3. The method of claim 1, further comprising updating an internal record for each ongoing Sy session between the PCRF and the OCS with application of the SLR command.

4. The method of claim 3, wherein updating an internal record for each ongoing Sy session between the PCRF and the OCS with application of the SLR command comprises, for each ongoing Sy session between the PCRF and the OCS,
    performing one of adding or removing the specified policy counter identifier to or from a list of policy counter identifiers for which the PCRF will receive status update notifications from the OCS for that Sy session.

5. The method of claim 1, wherein specifying application of the SLR command to all ongoing Sy sessions between the PCRF and the OCS comprises setting a Spending Limit Request Type Attribute Value Pair, AVP, of the SLR command to one of SUBSCRIBE_ALL or REMOVE_ALL.

6. The method of claim 1, wherein
    the All Users subscription trigger specifies provision of the identified network policy, and
    specifying application of the SLR command to all ongoing Sy sessions between the PCRF and the OCS comprises setting a Spending Limit Request Type AVP of the SLR command to SUBSCRIBE_ALL.

7. The method of claim 1, wherein
    the All Users subscription trigger specifies removal of the identified network policy, and
    specifying application of the SLR command to all ongoing Sy sessions between the PCRF and the OCS comprises setting a Spending Limit Request Type AVP of the SLR command to REMOVE_ALL.

8. A computer program product comprising a non-transitory computer readable medium storing software configured, when run on a computer, to carry out the method of claim 1.

9. A method performed in an Online Charging System (OCS) for managing subscription by a Policy and Charging Rules Function (PCRF) to a policy counter maintained at the OCS, wherein the OCS is operable to communicate with the PCRF over an Sy reference point, the method comprising:
    receiving a Spending Limit Request (SLR) command from the PCRF, the SLR command specifying an identifier of a policy counter and specifying application of the SLR command to all ongoing Sy sessions between the PCRF and the OCS; and
    applying the received SLR command with respect to the specified policy counter identifier to each ongoing Sy session between the OCS and the PCRF.

10. The method of claim 9, further comprising sending a Spending Limit Answer (SLA) to the PCRF, the SLA confirming application of the SLR command to all ongoing Sy sessions between the PCRF and the OCS.

11. The method of claim 9, wherein a Spending Limit Request Type Attribute Value Pair, AVP, of the SLR command is set to one of SUBSCRIBE_ALL or REMOVE_ALL.

12. The method of claim 11, wherein
    the Spending Limit Request Type AVP of the SLR command is set to SUBSCRIBE_ALL, and
    applying the received SLR command with respect to the specified policy counter identifier to each ongoing Sy session between the OCS and the PCRF comprises:
    for each ongoing Sy session between the OCS and the PCRF:
    determining whether the specified policy counter identifier is already present in an Sy session list of policy counter identifiers for which status update notifications are to be sent to the PCRF for that Sy session; and
    as a result of determining that the specified policy counter identifier is not already present in the Sy session list, adding the specified policy counter identifier to the Sy session list.

13. The method of claim 11, wherein
    the Spending Limit Request Type AVP of the SLR command is set to REMOVE_ALL, and applying the received SLR command with respect to the specified policy counter identifier to each ongoing Sy session between the OCS and the PCRF comprises:

for each ongoing Sy session between the OCS and the PCRF:

determining whether the specified policy counter identifier is present in an Sy session list of policy counter identifiers for which status update notifications are to be sent to the PCRF for that Sy session; and as a result of determining that the specified policy counter identifier is present in the Sy session list, removing the specified policy counter identifier from the Sy session list.

14. A computer program product comprising a non-transitory computer readable medium storing software configured, when run on a computer, to carry out the method of claim 9.

15. A Policy and Charging Rules Function (PCRF) for managing subscription to a policy counter maintained at an Online Charging System (OCS), wherein the PCRF is operable to communicate with the OCS over an Sy reference point, the PCRF comprising a processor and a memory, the memory containing instructions executable by the processor such that the PCRF is operable to:

receive an All Users subscription trigger from a network operator, the All Users subscription trigger identifying a network policy; and send a Spending Limit Request (SLR) command to the OCS, the SLR command specifying an identifier of a policy counter for the network policy and specifying application of the SLR command to all ongoing Sy sessions between the PCRF and the OCS.

16. An Online Charging System (OCS) for managing subscription by a Policy and Charging Rules Function (PCRF) to a policy counter maintained at the OCS, wherein the OCS is operable to communicate with the PCRF over an Sy reference point, the OCS comprising a processor and a memory, the memory containing instructions executable by the processor such that the OCS is operable to:

receive a Spending Limit Request (SLR) command from the PCRF, the SLR command specifying an identifier of a policy counter and specifying application of the SLR command to all ongoing Sy sessions between the PCRF and the OCS; and apply the received SLR command with respect to the specified policy counter identifier to each ongoing Sy session between the OCS and the PCRF.

* * * * *